Nov. 5, 1957  W. H. RUSCH  2,812,188
COLLAPSIBLE CART
Filed Dec. 9, 1954  4 Sheets-Sheet 2
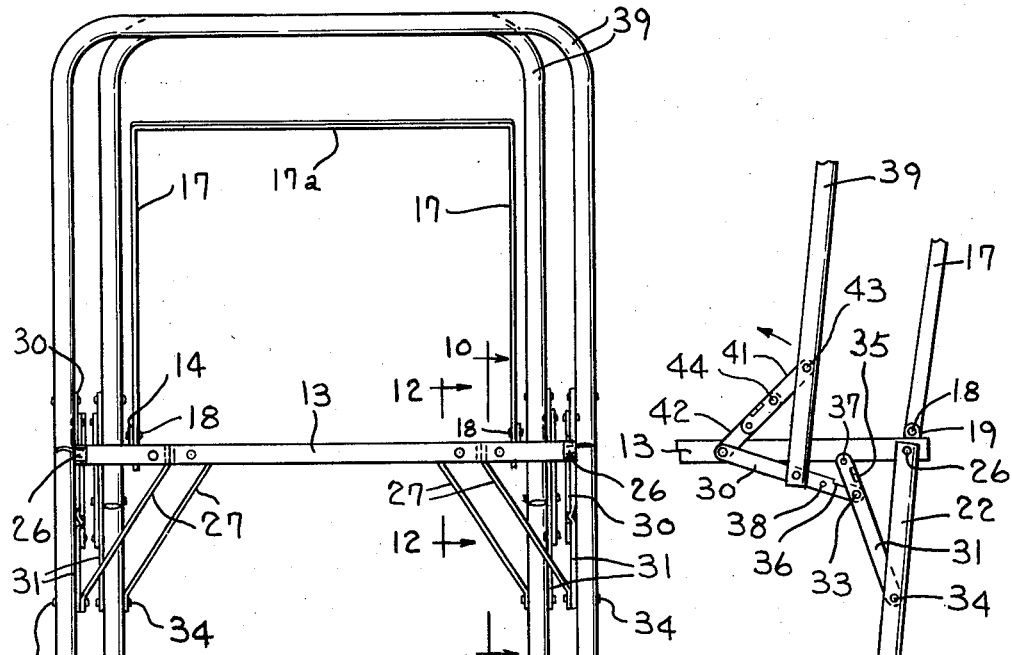
Fig. 2
Fig. 8
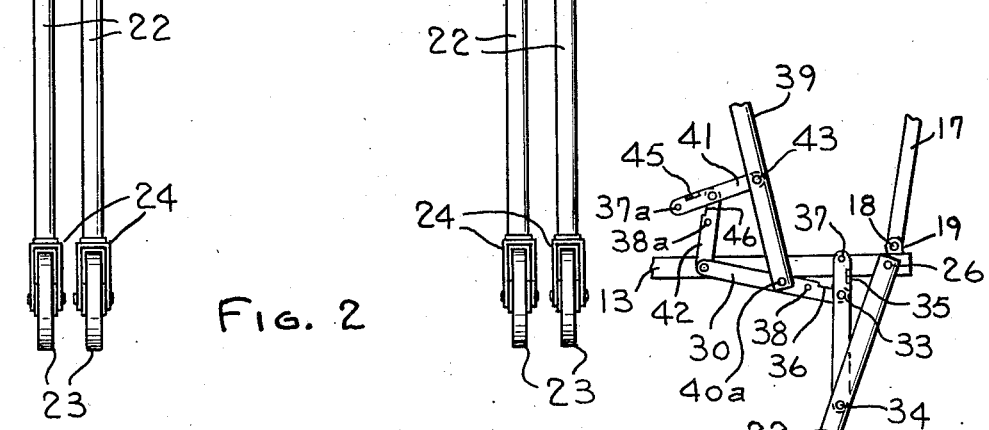
Fig. 9
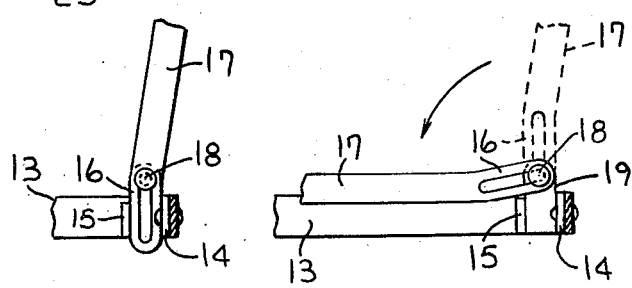
Fig. 10  Fig. 11
INVENTOR.
William H. Rusch
BY Quarles & French
Att'ys.

Nov. 5, 1957 W. H. RUSCH 2,812,188
COLLAPSIBLE CART
Filed Dec. 9, 1954 4 Sheets-Sheet 3

INVENTOR.
William H. Rusch
BY
Quarles & French
Att'ys

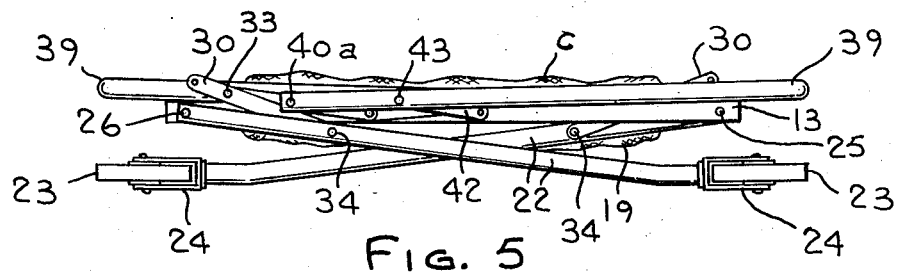
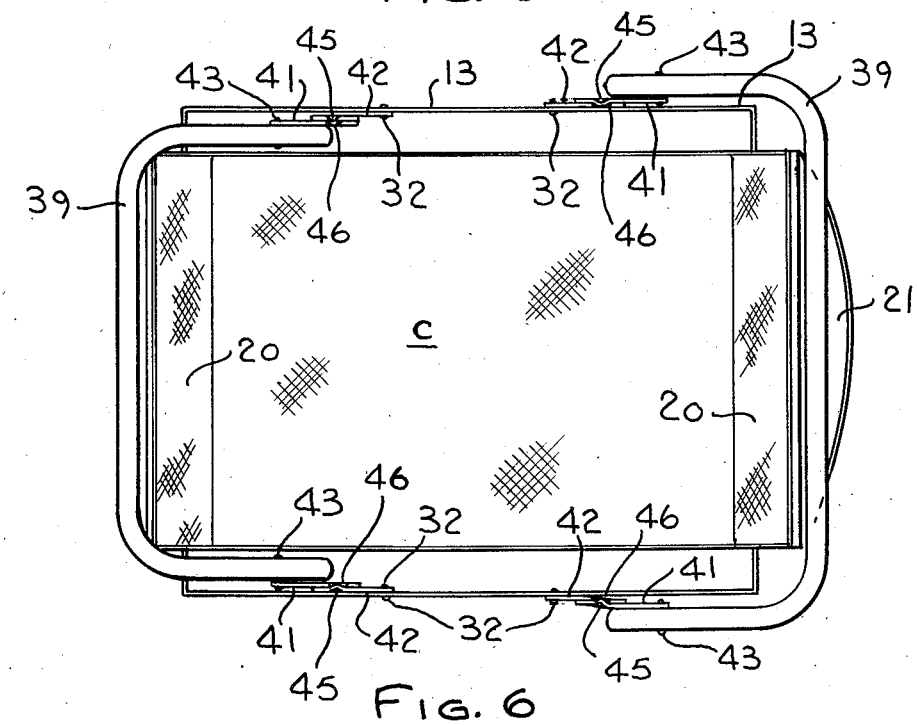
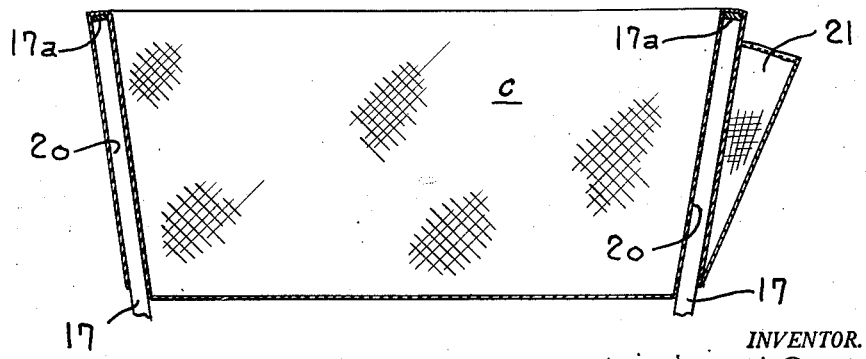

United States Patent Office 2,812,188
Patented Nov. 5, 1957

2,812,188

COLLAPSIBLE CART

William H. Rusch, Milwaukee, Wis., assignor to Worldsbest Industries, Inc., Cudahy, Wis., a corporation of Wisconsin Application December 9, 1954, Serial No. 474,075

6 Claims. (Cl. 280—41)

The invention relates to collapsible carts.

The main object of the invention is to provide a wheeled cart having a container portion for articles, such as laundry and in which the running gear may be collapsed by the operation of a pair of handles so that the device becomes a basket which may be carried by the handles up or down stairs or from one location to another where it would be inconvenient or impracticable to use the wheels as a support. It may also be used for carrying articles other than laundry as, for example, groceries, if desired.

A further object of the invention is to provide a wheeled cart which in addition to being collapsible or folded to a carrying basket position may also be completely collapsed in a small space for storage, mailing, or shipping purposes.

A further object of the invention is to provide a collapsible cart of the type above described which may also be used as a portable serving device.

The invention further consists in the several features hereinafter described and more particularly defined by claims at the conclusion hereof.

In the drawings:

Fig. 2 is an end elevation view of the structure;

Fig. 5 is a side elevation view of the completely collapsed structure;

Fig. 6 is a plan view of the structure with the container portion;

Fig. 7 is a detailed vertical sectional view through the container and its supports;

Fig. 8 is a view of parts of the linkage in an intermediate position;

Fig. 9 is a view similar to Fig. 8 showing the linkages in another position;

Fig. 10 is a detailed vertical sectional view taken on the line 10—10 of Fig. 2;

Fig. 11 is a view similar to Fig. 10 showing the container carrying arm in a collapsed condition;

Fig. 12 is a detailed vertical sectional view taken on the line 12—12 of Fig. 2.

Figure 1:
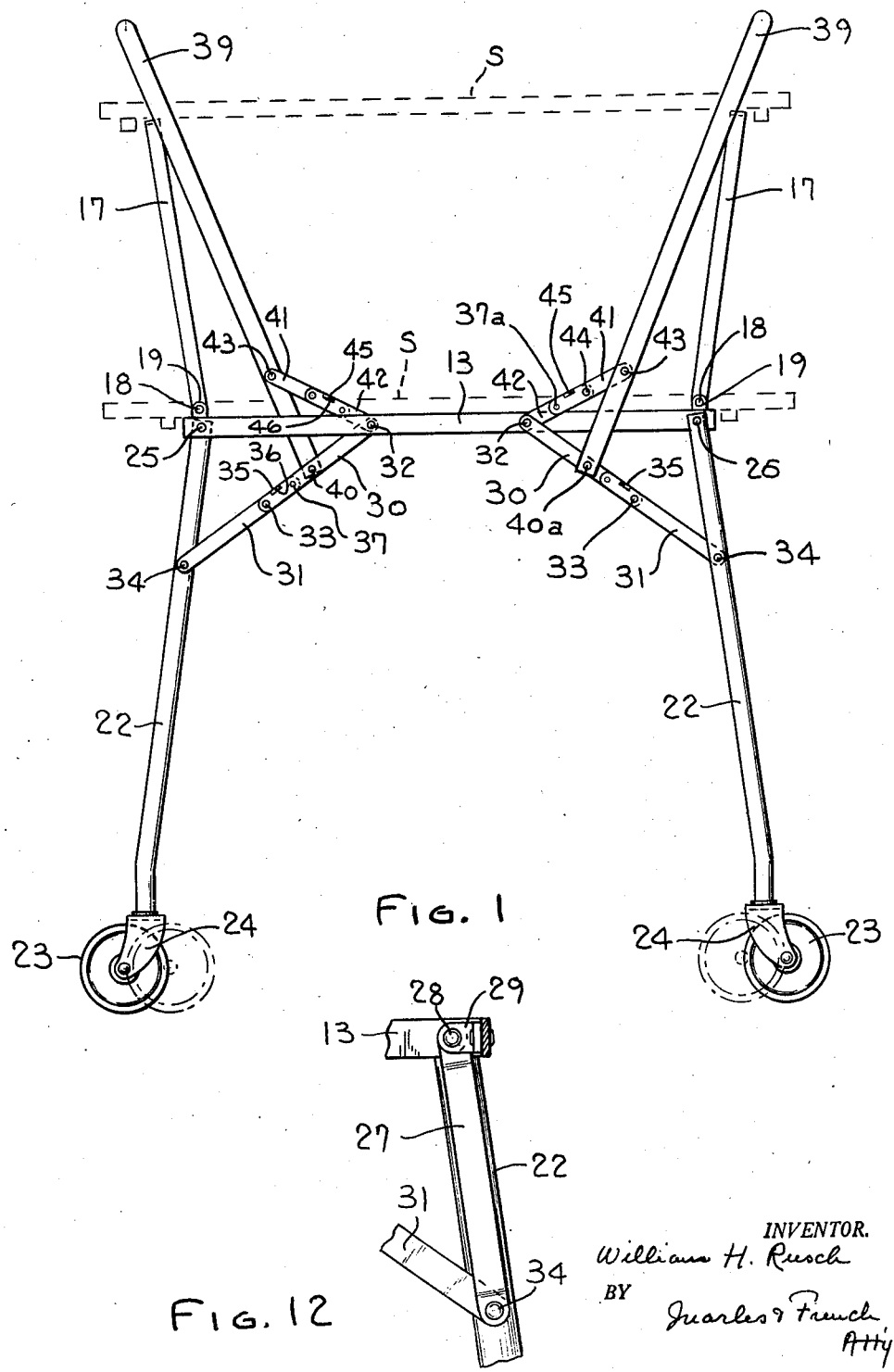
Fig. 1 is a side elevation view of the supporting structure embodying the invention.

Referring to Figs. 1, 4, 10, and 11, the device includes a rectangular metal frame 13 formed of strip stock whose ends are welded or otherwise suitably secured together. Opposite sides of this frame each have a set of spaced angled brackets 14 riveted thereto. Each bracket has a flange projection 15 cooperating with its base to form a guide for the lower slotted end 16 of a container carrying arm 17 which is connected to the bracket by a headed pin 18 mounted on the eared portion 19 of said bracket. With this construction, when the pin 18 is at the upper end of the slot in the arm 17, the arm bears against the projection 15 since the arm inclines outwardly from its lower end 16 so that the projection 15 acts as a stop as shown in Fig. 10. When the arm 17 is raised relative to the bracket 14 as shown in dotted lines in Fig. 11, it may then be swung downwardly toward the frame 13 to collapsed position in which its slotted end 16 engages the top of the stop flange 15. The sets of arms 17 are connected together by a bridge portion 17a to provide U-shaped foldable frame members.

Referring to Figs. 6 and 7, a flexible container C of any suitable flexible fabric or plastic is formed with a bottom and four sides, the oppositely disposed end sides being formed to provide pockets 20 adapted to receive the U-shaped frame members above mentioned. The container at one end may also be provided with a pocket 21 for receiving clothes pins or other articles. Since the container 19 is of flexible material, it may be folded with its frame members to a collapsed condition as shown in Fig. 5.

Referring to Figs. 1 to 3, 8, and 12, the running gear includes legs 22, each having a castor type wheel 23 mounted at its lower end so that its wheel mounting 24 can swivel about the lower end of the leg. The legs 22 at one end of the frame 13 are mounted on pivots 25 projecting inwardly from said frame adjacent the corners thereof. The legs 22 at the other end of the frame 13 are mounted on pivots 26 projecting outwardly from said frame adjacent the corners thereof. An angled brace rod 27 is fixed at one end to each leg and at its other end is pivotally connected by pin 28 with an eared bracket 29 secured to the frame. The above described mountings permit the legs 22 being moved downwardly to their operative positions shown in Figs. 1 and 2 or upwardly to a collapsed position shown in Figs. 3 and 5. Each leg is held in its operative position by a toggle linkage comprising links 30 and 31. One end of the link 30 is pivotally connected to the frame 13 by a pin 32 and pivotally connected at its other end to one end of the link 31 by a pin 33. The other end of the link 31 is pivotally connected to the leg by a pin 34 which also forms the anchorage connection for the brace rod 27. The links 30 and 31 are held in their aligned or leg holding position by providing a tongue 35 on one engaging a notch 36 on the other and may also be further releasably locked in this position by upsetting a portion of one link to form a detent 37 adapted to engage a recess or cavity 38 in the other link.

For moving the sets of legs 22 to a folded or collapsed position a pair of U-shaped handles 39, operatively connected to the legs, are provided. One of the handles 39 is connected at its lower ends by pivot pins 40 to the intermediate portions of the links 30 for one set of legs and the other handle is similarly connected by pivot pins 40a to the links 30 for the other set of legs. The lower ends of each of the handles are each fulcrumed on a swinging link pivotally mounted on the frame 13. To permit the folding of the handles 39 to a collapsed condition, each of the fulcrum links comprises link members 41 and 42. The link 41 is pivotally connected by a pin 43 to one arm or leg of a handle 39 and pivotally connected at its other end by a pin 44 to one end of the link 42. The other end of the link 42 is pivotally connected to one of the pins 32. The links 41 and 42 are normally held in a straight or aligned position to act as a single link by a detented surface 45 of one engaging a similar cavity notch 46 on the other and detents 37a and cavities 38a similar to the detents 37 and cavities 38.

Figure 3:
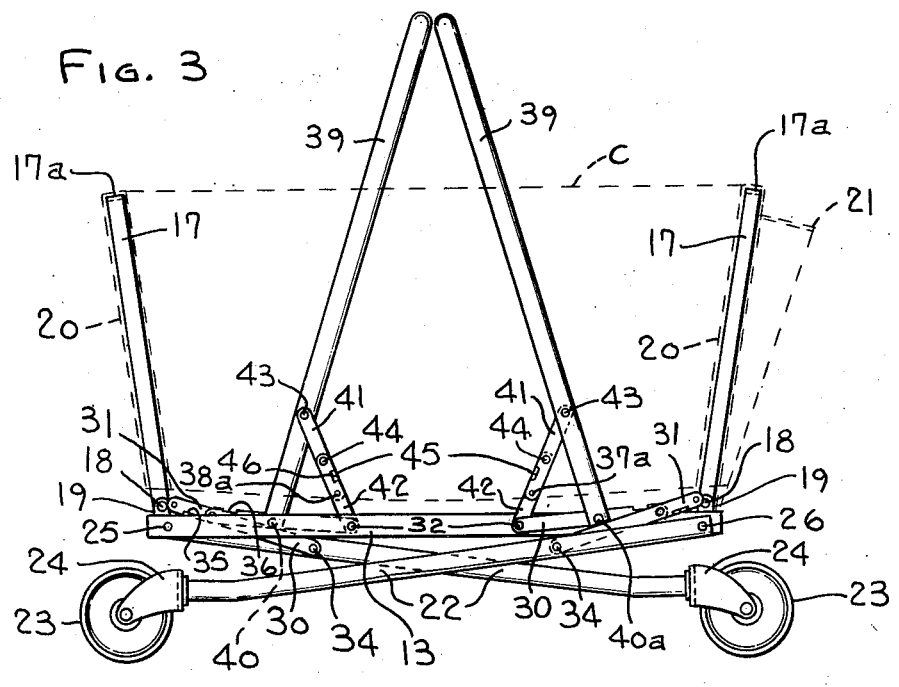
Fig. 3 is a side elevation view of the structure in its basket forming position.
Figure 4:
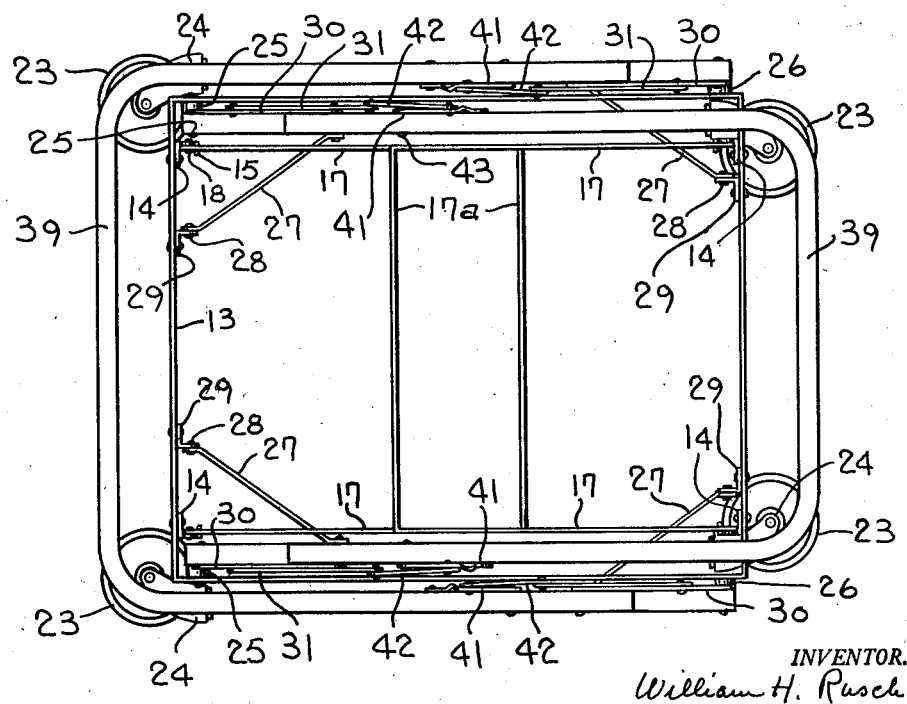
Fig. 4 is a plan view of the structure in its completely collapsed condition.

With the above construction when the handles 39 are swung inwardly from the wheeled cart position shown in Fig. 1 to the basket carrying position shown in Fig. 3 during the first part of this movement, the sets of toggle links 30 and 31 are broken and the links formed by link members 41 and 42 are swung upwardly as shown in Fig. 8 in connection with one set of the links 30 and 31, and one of the links forming the link members 41 and 42. Thereafter as the handles are swung further inwardly to the position in Fig. 3, the composite link 41, 42 continues to swing upwardly while the lower ends of the handles 39 acting through the links 30 acts to collapse the sets of links 30 and 31, thereby swinging the legs 22 upwardly into their fully folded condition. In this position to obtain a completely collapsed condition, the arms 17 are folded down with the container 19 as previously described and then the links 41 and 42 connecting these handles with the frame are broken as indicated in Fig. 9 so that the operator may then fold the handles down upon the top of the other folded parts as shown in Fig. 5.

In the collapsed form as shown in Fig. 5 the device may be packed in a shipping container, or stored, or carried, or transported to a place of use. The reverse of the above operations is carried out in setting the structure up for use as a basket or a cart.

Where the structure is used for laundry, it is set up as a container carrying cart as shown in Figs. 1 and 7 so that it may be wheeled around. Then if the filled container has to be taken up or down a flight of stairs, the handles 39 are swung inwardly to the position shown in Fig. 3 so that these handles may serve as basket handles for carrying the filled container. Also the container 19 may be slipped off of the arms and shelves S indicated in dotted lines in Fig. 1 may be mounted to rest on the frame 13 and the bridges 17a, respectively, to form supports for dishes or other articles and thus used as a wheeled serving tray. The arms 17 act as supports whether a tray or a container is mounted thereon.

I desire it to be understood that this invention is not to be limited to any particular form or arrangement of parts except in so far as such limitations are included in the claims.

What I claim as my invention is:

1. In a cart structure, the combination of a frame, container supporting arms mounted at opposite ends of said frame for mounting a container on said frame, sets of wheel carrying legs swingably mounted on opposite ends of said frame and movable from a folded position beneath and alongside the frame to a depending operative position, toggle linkage connections between each leg and the frame to hold the leg in its operative position, and means for swinging said legs to their operative and inoperative positions comprising a swingable handle for each set of legs, swingable links forming fulcrum connections between each handle and the frame, and a connection between each handle and one of the links connecting a leg with the frame.

2. In a cart structure, the combination of a frame, supporting arms swingably mounted on opposite ends of said frame for placement of said arms in operative and inoperative positions relative to said frame, sets of wheel carrying legs swingably mounted on opposite ends of said frame and movable from a folded position beneath the frame to a depending operative position, and means for swinging said legs to their operative and inoperative position comprising a swingable handle for each set of legs operatively connected to said legs and frame and disposed at the same ends of said frame as said arms, each of said handles being foldable down adjacent the frame when the legs and supporting arms are in an inoperative position.

3. In a cart structure, the combination of a frame, U-shaped supporting arms mounted on opposite ends of said frame and having a pin and slot connection therewith permitting placement of said arms in inoperative and operative positions relative to said frame, sets of wheel carrying legs swingably mounted at opposite ends of said frame and movable from a folded position beneath the frame to a depending operative position, linkage connections between each leg and the frame to hold the leg in its operative position, and means for swinging said legs to their operative and inoperative positions comprising a swingable U-shaped handle for each set of legs, swingable links forming fulcrum connections between the legs of each handle and the frame, and a connection between each handle and the linkages connecting the legs with the frame.

4. In a cart structure, the combination of a carrier frame, sets of wheel carrying legs swingably mounted on opposite ends of said frame and movable from a folded position beneath the frame to a depending position, a toggle link connection between an intermediate portion of each leg and the frame to hold the leg in its operative position, a set of handles, each handle pivotally connected at its lower end to said toggle link connection adjacent one end of the frame, and linkage means between said handle and frame pivotally connected to each handle intermediate the ends thereof for swingably supporting each handle at an intermediate point spaced from said frame, inward swinging of each handle acting to break the toggle link connection of the leg to the frame and through said toggle linkage swing the leg upwardly against the bottom of the frame.

5. In a cart structure as claimed in claim 4, wherein the linkage means for swingably supporting each handle are breakable toggle linkages permitting the handles to be folded down onto the top of the frame.

6. In a cart structure, the combination of a frame, a flexible container, container carrying frame members mounted on the frame, sets of wheel carrying legs swingably mounted on the frame and movable from a folded position beneath the frame to a depending operative position, and means for swinging said legs to their operative and inoperative position comprising a swingable handle for each set of legs and links operatively connecting said handle to said legs and frame and adapted to permit swinging said handles inwardly towards each other into abutting engagement at their upper ends when in their inoperative position to act as a single grip carrying means for the cart structure.

References Cited in the file of this patent

UNITED STATES PATENTS

| | | |
|---|---|---|
| 1,259,825 | Basile | Mar. 19, 1918 |
| 1,632,808 | Sztogryn | June 21, 1927 |
| 1,979,406 | Pehrsson | Nov. 6, 1934 |
| 2,044,517 | Thomas | June 16, 1936 |
| 2,168,513 | Cobb | Aug. 8, 1939 |
| 2,623,755 | Terry | Dec. 30, 1952 |